United States Patent
Baier et al.

(10) Patent No.: US 11,504,643 B2
(45) Date of Patent: Nov. 22, 2022

(54) ROTARY EVAPORATOR AND METHOD FOR CONTROLLING A ROTARY EVAPORATOR

(71) Applicant: IKA-WERKE GMBH & CO. KG, Staufen (DE)

(72) Inventors: Matthias Baier, Staufen (DE); Armin Wiesler, Staufen (DE)

(73) Assignee: IKA-WERKE GMBH & CO. KG, Staufen (DE)

( * ) Notice: Subject to any disclaimer, the term of this patent is extended or adjusted under 35 U.S.C. 154(b) by 0 days.

(21) Appl. No.: 17/059,722

(22) PCT Filed: May 15, 2019

(86) PCT No.: PCT/EP2019/062440
§ 371 (c)(1),
(2) Date: Nov. 30, 2020

(87) PCT Pub. No.: WO2019/228801
PCT Pub. Date: Dec. 5, 2019

(65) Prior Publication Data
US 2021/0213371 A1  Jul. 15, 2021

(30) Foreign Application Priority Data

Jun. 1, 2018  (DE) .......................... 102018113118.6

(51) Int. Cl.
*B01D 3/42*  (2006.01)
*B01D 3/08*  (2006.01)
*G01F 23/00*  (2022.01)

(52) U.S. Cl.
CPC .............. *B01D 3/42* (2013.01); *B01D 3/085* (2013.01); *G01F 23/00* (2013.01)

(58) Field of Classification Search
CPC ............ B01D 3/085; B01D 3/42; G01F 23/00
See application file for complete search history.

(56) References Cited

U.S. PATENT DOCUMENTS 4,522,684 A * 6/1985 Saito ...................... B01D 3/085
                                                    159/11.2
4,738,295 A * 4/1988 Genser .................. B01D 3/085
                                                    159/11.2
(Continued)

FOREIGN PATENT DOCUMENTS

CN       202376776 U      8/2012
CN       204159057 U      2/2015
(Continued)

OTHER PUBLICATIONS

Office Action received for the German Patent Application No. 102018113118.6, dated Feb. 25, 2019, 5 pages.
(Continued)

*Primary Examiner* — Jonathan Miller
(74) *Attorney, Agent, or Firm* — Amster, Rothstein & Ebenstein; Steven Hertzberg

(57) ABSTRACT

The present invention relates to a rotary evaporator (1) comprising an evaporator flask (10) and a heating bath (20), wherein the evaporator flask (10) can be dipped into the heating bath (20), further comprising a dipping control device (40) for controlling the dipping depth of the evaporator flask (10) into the heating bath (20), wherein the dipping control device (40) is set up to determine the level (25) of the heating bath (20) and wherein the dipping control device (40) is set up to control the dipping depth of the evaporator flask (10) into the heating bath (20) in dependence on the level (25) of the heating bath (20).

14 Claims, 2 Drawing Sheets

(56) References Cited

U.S. PATENT DOCUMENTS

| | | | | |
|---|---|---|---|---|
| 4,780,178 | A * | 10/1988 | Yoshida | B01D 1/0052 159/44 |
| 5,337,806 | A * | 8/1994 | Trunner | B01D 3/085 137/571 |
| 5,589,135 | A * | 12/1996 | Bossart | B01D 3/085 202/238 |
| 7,150,807 | B2 * | 12/2006 | Genser | B01D 3/085 159/6.1 |
| 8,956,506 | B2 * | 2/2015 | Carl | B01D 3/085 202/238 |
| 9,005,403 | B2 * | 4/2015 | Adjabeng | B01D 1/228 202/185.4 |
| 2010/0193140 | A1 * | 8/2010 | Carl | B01D 3/085 159/11.1 |
| 2010/0193345 | A1 * | 8/2010 | Carl | B01D 3/085 202/238 |
| 2013/0327631 | A1 * | 12/2013 | Hauser | B01D 3/085 202/238 |
| 2014/0144767 | A1 * | 5/2014 | Jost | B01D 3/10 203/2 |
| 2017/0252668 | A1 * | 9/2017 | Adjabeng | B01D 3/02 |

FOREIGN PATENT DOCUMENTS

| | | |
|---|---|---|
| CN | 104801056 A | 7/2015 |
| CN | 106422387 A | 2/2017 |
| CN | 206228964 U | 6/2017 |
| CN | 206355620 U | 7/2017 |
| CN | 206454296 U | 9/2017 |
| CN | 206793060 U | 12/2017 |
| CN | 107930172 A | 4/2018 |
| CN | 207307906 U | 5/2018 |
| DE | 3511981 A1 | 11/1986 |
| DE | 3522607 A1 | 1/1987 |
| DE | 10114434 A1 | 10/2002 |
| DE | 102099006819 | 8/2010 |
| DE | 102011115418 A1 | 4/2013 |

OTHER PUBLICATIONS

International Search Report and Written Opinion received for the PCT Application No. PCT/EP2019/062440, dated Jul. 12, 2019, 10 pages.

Office Action received for the Chinese Patent Application No. 201980036387.7, dated Sep. 3, 2021, 18 pages (10 pages of English Translation and 8 pages of Original Copy).

Office Action received for the European Patent Application No. 19725090.5, dated Dec. 22, 2021, 5 pages.

Office Action received for the Chinese Patent Application No. 201980036387.7 dated Jul. 21, 2022, 22 pages (11 pages of English Translation and 11 pages of Original Copy).

* cited by examiner

ROTARY EVAPORATOR AND METHOD FOR CONTROLLING A ROTARY EVAPORATOR

CROSS REFERENCE TO RELATED APPLICATION

This application claims benefit under 35 U.S.C. § 371 to international application No. PCT/EP2019/062440 filed on May 15, 2019, which claims priority to German application No. 102018113118.6 filed Jun. 1, 2018, the contents of which are incorporated by reference in their entireties.

FIELD OF INVENTION

The present invention relates to a rotary evaporator, in particular a rotary evaporator with a control device, and a method for controlling this rotary evaporator.

BACKGROUND OF INVENTION

In WO 2010/043283 A1, a rotary evaporator with a controller for controlling the distillation quantity regulation is provided.

In DE 10 2009 006 819 A1, a rotary evaporator is described which has a controlling and regulating unit for controlling the rotary drive, a heating bath and a lift via a remote control, with the result that it is also possible for an operator to intervene from a physical distance.

It was perceived to be a disadvantage of the rotary evaporators in the state of the art that they needed to be monitored during operation in order to be able to intervene if necessary.

SUMMARY OF INVENTION

The object of the present invention was, therefore, to provide a rotary evaporator which avoids the disadvantages of the state of the art.

This object is achieved according to the invention by the features of the independent claims. Advantageous embodiments are specified in the dependent claims.

In particular, the object is achieved by a rotary evaporator comprising an evaporator flask and a heating bath, wherein the evaporator flask can be dipped into the heating bath, preferably via a lift with which the evaporator flask can be moved vertically, further comprising a dipping control device for controlling the dipping depth of the evaporator flask into the heating bath, wherein the dipping control device is set up to determine the level of the heating bath and wherein the dipping control device is set up to control the dipping depth of the evaporator flask into the heating bath in dependence on the level of the heating bath.

As a rule, a rotary evaporator comprises an evaporator flask which can be dipped into a heating bath. This dipping process can consist of lowering the evaporator flask into the heating bath and/or of raising the heating bath. The dipping process is preferably effected via a lift, with which the evaporator flask can be moved vertically and thus can be dipped into the heating bath arranged under the evaporator flask. It is preferably provided that the heating bath can be moved vertically upwards and thus the evaporator flask can be dipped into the heating bath. Particularly preferably, the evaporator flask can be moved vertically and the heating bath can also be moved vertically. The dipping depth of the evaporator flask into the heating bath is thus a relative quantity, which is made up of the lowering of the evaporator flask and the raising of the heating bath. The evaporator flask is rotated about its longitudinal axis using a rotary drive and the components introduced into the evaporator flask are thereby evaporated in a temperature-dependent manner. These evaporated components are channeled into a vertical condenser and condensed there and collected in a collecting flask connected thereto. A control unit, with which the temperature of the heating bath can be regulated, is preferably provided for the heating bath. A topping-up device can also preferably be provided, with which the medium of the heating bath, preferably water or oil, in particular silicone oil, can be topped up in a metered manner. It is thus possible to compensate for losses in the heating bath, which can arise over time for example due to vaporization, without having to interrupt the evaporation process of the rotary evaporator. The rotary evaporator preferably also has a control unit with which the rotation of the evaporator flask can be controlled.

The rotary evaporator has a dipping control device for controlling the dipping depth of the evaporator flask into the heating bath. The dipping control device preferably comprises a processor, via which the dipping process can be controlled. The dipping control device can also be formed together with further control equipment, such as for example the control unit for regulating the heating bath or the control unit with which the rotation of the evaporator flask can be controlled.

The dipping control device is set up to determine the level of the heating bath. The level of the heating bath and equally the filling level of the evaporator flask are variable quantities, since the mixture in the evaporator flask decreases due to the evaporation of the component to be removed and the level of the heating bath is increased by lowering the evaporator flask into the heating bath, since the heating flask increases the level of the medium in the heating bath through displacement by the amount in which it is lowered into the heating bath. At the same time, it can also be provided that further medium is channeled into the heating bath during operation, which causes the level of the heating bath to rise.

The dipping control device is set up to control the dipping depth of the evaporator flask into the heating bath in dependence on the level of the heating bath. The rotary evaporator can thus be operated automatically with an optimum dipping depth of the evaporator flask in the heating bath even if the level of the medium in the heating bath changes; in particular the level of the medium in the heating bath rises through displacement due to the process of dipping the evaporator flask into the heating bath. The displacement is lower in the case of a small flask than in the case of a large flask and thus the rise in the level of the medium in the heating bath is also lower. This control is preferably carried out via a lift, via which the evaporator flask can be moved vertically, and, through control of the lift, the dipping control device can realize or control and also regulate the predefined or optimum dipping depth. In this form, the dipping control device is thus also a dipping regulation device.

The level of the heating bath can be calculated mathematically based on the amount of heating medium originally added or can also be determined by sensors.

The dipping control device is preferably additionally set up to determine the bottom of the heating bath and also set up to control the dipping depth of the evaporator flask into the heating bath in dependence on the bottom of the heating bath.

The bottom of the heating bath is the lowest level in the heating bath. In the case of a heating bath with a horizontal base plate, the bottom of the heating bath is the upper boundary of this base plate. The evaporator flask cannot be lowered beneath this bottom of the heating bath since it would then already come into contact with the bottom and cannot be lowered further. The bottom of the heating bath is thus a useful parameter in order to control the dipping depth of the evaporator flask.

The dipping control device is furthermore preferably set up to determine the filling level of the evaporator flask and the dipping control device is also set up to control the dipping depth of the evaporator flask into the heating bath in dependence on the filling level of the evaporator flask. This can either be effected only in combination with the control of the dipping depth of the evaporator flask into the heating bath in dependence on the level of the heating bath or also in dependence on the bottom of the heating bath.

The filling level of the evaporator flask is the level to which the evaporator flask is filled. It is the horizontal level which forms with the mixture that is located in the evaporator flask during operation of the rotary evaporator. This level is parallel to the surface of the liquid which is located in the heating bath and has a predefined depth there.

At the same time, it can also be provided that further mixture is added to the evaporator flask during operation, which leads to an increase in the filling level in the evaporator flask.

The dipping control device is preferably set up to control the dipping depth of the evaporator flask into the heating bath in dependence on the filling level of the evaporator flask and in dependence on the level of the heating bath. The rotary evaporator can thus be operated automatically with an optimum dipping depth of the evaporator flask in the heating bath even if the filling level in the evaporator flask or the level of the medium in the heating bath changes. This control is preferably carried out via a lift, via which the evaporator flask can be moved vertically, and, through control of the lift, the dipping control device can realize or control and also regulate the predefined or optimum dipping depth.

In a known type of evaporator flask, the filling level can be directly calculated mathematically at the start based on the filling quantity or can be determined by sensors (thus also irrespective of type). The level of the heating bath can also be calculated mathematically based on the amount of heating medium originally added or can also be determined by sensors.

A preferred embodiment example of the rotary evaporator has sensors via which the filling level of the evaporator flask and/or the level of the heating bath can be determined. The sensors preferably function according to one or more of the following principles: optically, mechanically, thermoelectrically, resistively, piezoelectrically, capacitively, inductively, magnetically. Optical, mechanical, thermoelectric, resistive or piezoelectric sensors, with which the filling level is preferably determined via the optical characteristic or the weight or the conductivity, are preferably used for the sensors for the determination of the filling level in the evaporator flask. Optical, mechanical, thermoelectric, resistive, piezoelectric, capacitive, inductive or magnetic sensors, with which the depth is preferably determined via the optical characteristic or the weight or the moisture level or the conductivity, are preferably used for the sensors for the determination of the level of the heating bath.

The rotary evaporator preferably has sensors which have one or more elements of the following group: light barrier, preferably an analogue light barrier, weight sensor, photosensor, camera, infrared LED, ultrasonic sensor, microwave transmitter and receiver, radar sensor, moisture sensor, filling-level meter, float, level sensor, vibration sensor, electromechanical plumb system, pressure sensor, conductivity sensor, temperature sensor.

The filling level can preferably be determined by means of a light barrier by guiding the filled flask past the light barrier via the lift and in the process the filling level can be determined. Preferably, it is also possible to move the light barrier and, in the process, to detect the filling level. An analogue light barrier is particularly preferably used.

The weight of the heating bath, or the weight of the evaporator flask and thus the size of the evaporator flask, can be detected by means of a weight sensor. It is thereby possible to determine the filling level or also, through the increase in the weight of the heating bath when the evaporator flask is dipped in, to determine the rise in the level of the heating bath due to the displacement. Moreover, it is also possible to determine the weight (or the level) of the evaporated component which has been collected in the collecting flask, and to draw conclusions on the actual filling level in the evaporator flask via comparative observations.

Using a photosensor, in particular using a camera, it is possible to take a picture which can be analysed in order to detect the filling level. It is also possible to determine the level of the heating bath in this way. For this purpose, the heating bath particularly preferably has, at least partially, a transparent area through which the level of the medium in the heating bath is to be detected visually. This can be effected, for example, by forming the heating bath in a transparent design (glass/acrylic/etc.), with the result that the entire side wall at which the camera is pointed, for example, is formed transparent or at least a strip on the wall of the heating bath, preferably in the vertical direction, is formed transparent, with the result that the level can be detected visually from the outside. Here, a marking is particularly preferably also applied, which makes it easier to read off the level or to evaluate the value of the level.

Infrared LEDs, for example in the form of light barriers or motion sensors, can also be used for the detection of the filling level and of the level. Likewise, ultrasonic sensors, microwave transmitters and receivers or radar sensors are suitable for this purpose.

The level in the heating bath can be determined via a moisture sensor which is preferably arranged vertically in the heating bath. This is also possible via a filling-level meter with a different design, for example a filling-level meter which is equipped with a float or level sensor. This can also comprise a vibration sensor or an electromechanical plumb system.

The weight can be determined via a pressure sensor and the level or the filling level can thereby be deduced. The level of the heating bath can be determined via a conductivity sensor, preferably arranged on the rim of the heating bath.

In an embodiment example, a moving device for the vertical movement of the evaporator flask is provided, in particular a moving device integrated in a lift.

Using such a lift, the evaporator flask can be lowered vertically into the heating bath. In addition, in its fastening to the rotary evaporator the evaporator flask can form an angle with respect to the horizontal plane, this is preferably approx. 30°. Via the lift, the evaporator flask as a whole is moved vertically without changing the angle of the evaporator flask with respect to the horizontal plane. By means of the movement via the lift, it is thus possible to lower the evaporator flask into the heating bath, with the result that the lift is preferably actuated in order to lower the evaporator flask into the heating bath and to raise it again.

It is preferably also possible to change the dipping depth of the evaporator flask by changing the angle of the evaporator flask with respect to the horizontal plane. The dipping depth can thus be changed by tilting the evaporator flask into the heating bath.

The object of the present invention is also achieved by a method for controlling a rotary evaporator, wherein the rotary evaporator comprises an evaporator flask and a heating bath, wherein the evaporator flask can be dipped into the heating bath, preferably via a lift with which the evaporator flask can be moved vertically, further comprising a dipping control device for controlling the dipping depth of the evaporator flask into the heating bath, with the steps of: determining the level of the heating bath, controlling the dipping depth of the evaporator flask into the heating bath in dependence on the level of the heating bath.

The level of the heating bath is the surface of the medium in the heating bath. It is aligned horizontally due to gravity.

Through the determination of the level of the heating bath it is known at what level or at what height the surface of the medium is located in the heating bath.

The control of the dipping depth of the evaporator flask now takes place in dependence on this quantity. A maximum level which may not be exceeded is preferably determined here, for example, and, when this maximum level is reached, the evaporator flask is not lowered further in order not to bring about a further increase in the level of the medium in the heating bath. In addition, it is also possible to lower the level by draining medium from the heating bath and then it is possible to lower the evaporator flask further.

Furthermore, the following steps are preferably included: determining the bottom of the heating bath; and controlling the dipping depth of the evaporator flask into the heating bath in dependence on the bottom of the heating bath.

The lowering of the evaporator flask can hereby additionally be controlled by taking into consideration the lowest value which the flask should not fall below, since otherwise it could be damaged by contact with the bottom or base of the heating bath.

Furthermore, the following steps are further preferably included: determining the filling level of the evaporator flask; and controlling the dipping depth of the evaporator flask into the heating bath in dependence on the filling level of the evaporator flask.

These steps can either be effected in combination with the control in dependence on the bottom of the heating bath, or without it.

The filling level is the upper level formed by the mixture in the evaporator flask. It extends parallel to the surface of the medium in the heating bath, i.e. the level of the heating bath. Both are aligned horizontally due to gravity.

Through the determination of the filling level based on the one hand on the evaporator flask and on the other hand on the known height of the evaporator flask above the base of the heating bath, it is known, also with respect to this reference of the base of the heating bath, at what level, that is at what height, this upper edge or boundary of the mixture is located inside the evaporator flask.

The control of the dipping depth of the evaporator flask now takes place in dependence on these two quantities. Here, a target configuration is preferably chosen, for example, in which the filling level of the evaporator flask comes to lie at a predefined value below the level of the heating bath. This predefined value is preferably between 0.5 and 2 cm, particularly preferably between 0.8 and 1.2 cm, quite particularly preferably approx. 1 cm. In this configuration, an area of the evaporator flask above the filling level but below the level is heated directly by the heating bath through the heating bath medium, before this area of the evaporator flask comes into contact with the mixture in the evaporator flask during the rotation, and, for another thing, is conveyed in a particularly heated area on the other side of the evaporator flask through entrainment of the mixture due to adhesion, with the result that a particularly good evaporation of the component to be separated from the mixture can occur here.

Preferably, it is also possible to react to changes in the filling level and/or the level during the control, with the result that the dipping depth can also be tracked during operation such that the target configuration is achieved. Preferably, care can also be taken here that a minimum distance is maintained between the lower boundary of the evaporator flask and the base of the heating bath. If there is a danger of falling below this minimum distance, the control device can preferably meter the addition of medium of the heating bath, such that the level in the heating bath rises again and thus the dipping depth can be reduced, with the result that the distance from the base can be ensured again. A minimum distance between the upper rim of the heating bath and the neck of the evaporator flask is preferably also ensured, that is an area which is not dipped into the heating bath.

Here, the filling level or the level of the heating bath is preferably monitored continuously or at least determined at predefinable time intervals, with the result that it is possible to react to changes in the filling level (due to evaporation of the component in the mixture) as well as the level (due to vaporization of the medium of the heating bath).

The method preferably has the following steps: determining the filling level of the evaporator flask using a sensor, determining the level of the heating bath using a sensor, and controlling the dipping depth of the evaporator flask into the heating bath in dependence on the filling level of the evaporator flask and in dependence on the level of the heating bath.

Using a sensor to determine the filling level or the level provides several technical implementation possibilities. Here, optical sensors are preferably used, such as for example a light barrier or a photo element or a camera.

In a further preferred method, the following further step is provided: measuring out medium for the heating bath again in dependence on the filling level of the evaporator flask.

It is hereby possible to measure out medium for the heating bath again after it has evaporated or been lost over time, with the result that these losses are compensated for.

Measuring out again can also consist of taking away medium for the heating bath if the level of the heating bath rises above a predefined value for example due to the process of dipping the evaporator flask, with the result that the heating bath can be prevented from overflowing.

BRIEF DESCRIPTION OF THE DRAWINGS

Further details and advantages of the invention are now to be explained in more detail with reference to an embodiment example represented in the drawings.

There are shown in.

DETAILED DESCRIPTION OF THE INVENTION

Figure 1A:
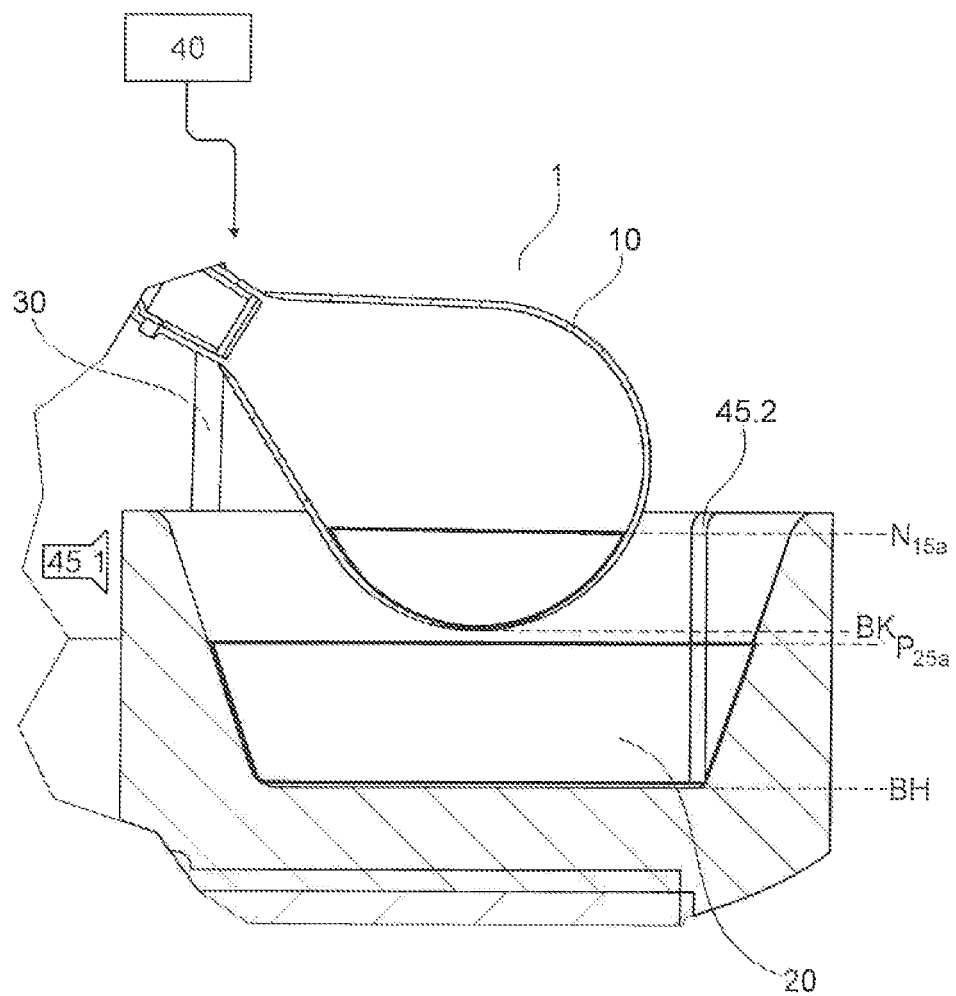
FIG. 1a a schematic representation of an evaporator flask and a heating bath of a rotary evaporator in a starting position, and FIG. 1b a schematic representation of an evaporator flask and a heating bath of a rotary evaporator from FIG. 1a in a lowered position.

FIG. 1a is a schematic representation of an evaporator flask 10 and a heating bath 20 of a rotary evaporator 1 in a starting position, in which the evaporator flask 10 is located above the heating bath 20 and is not dipping into it.

The rotary evaporator 1, only a section of which is represented here, which above all shows the evaporator flask 10 and the heating bath 20 as well as a lift 30, also has a dipping control device 40. This is connected to the rotary evaporator by wire, or via radio link or wirelessly. Using this dipping control device 40, the evaporator flask 10 can be moved vertically by means of the lift 30, with the result that the dipping depth of the evaporator flask 10 into the heating bath 20 can be controlled. The filling level of the mixture in the evaporator flask 10 is indicated on the right with the reference N15a and denotes the upper edge of the mixture in the evaporator flask 10. The lower boundary of the evaporator flask is indicated with the reference BK and denotes the level at which the base of the flask is located. The level of the medium in the heating bath 20 in the configuration of FIG. 1a is indicated with the reference P25a. It is the level of the medium in the heating bath which is established when the flask is not dipped into the heating bath. This is the minimum level since dipping the flask into the heating bath will always increase this level.

Two sensors 45.1 and 45.2 are represented, which detect the filling level N15a and the level P25a. The sensor 45.1 is preferably an optical sensor, in particular a camera, which determines the filling level N15a. Moreover, the position of the base of the flask BK can also be determined via the sensor 45.1. The sensor 45.1 can likewise be set up to determine the level P25a of the heating bath. As an alternative or in addition, a sensor 45.2 can also be provided, which here is formed as level sensor and determines the filling level of the heating bath or the level of the heating bath P25a.

Figure 1B:
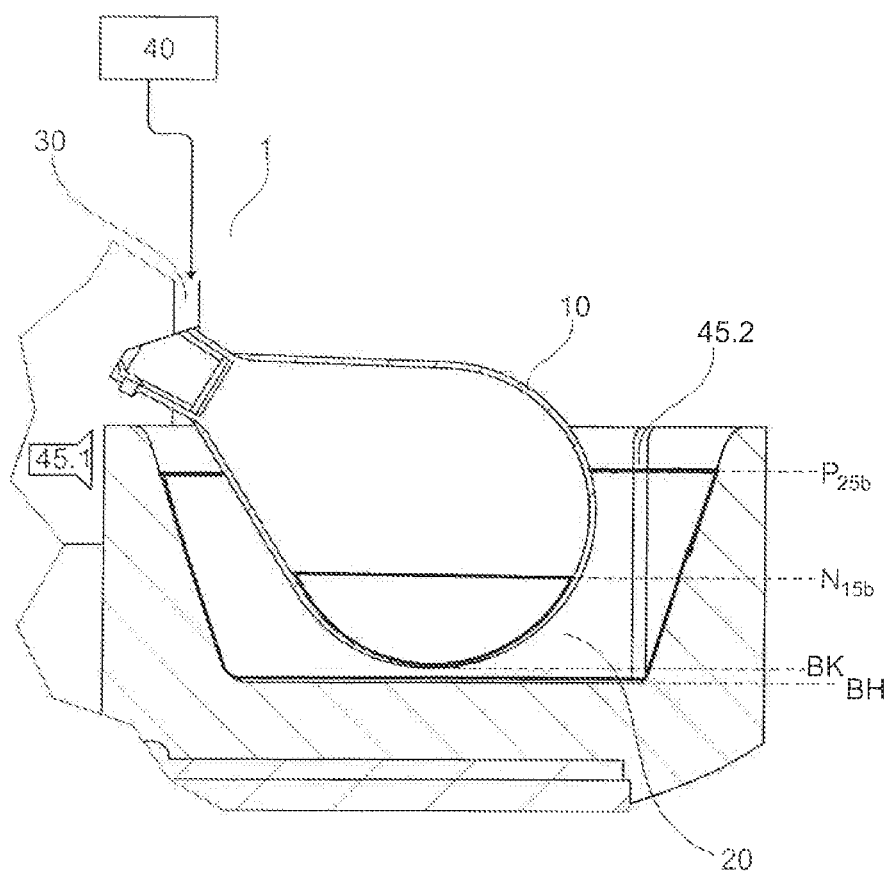

FIG. 1b is a schematic representation of an evaporator flask 10 and a heating bath 20 of a rotary evaporator 1 as shown in FIG. 1a, but in a lowered position.

Starting from the situation in FIG. 1a, the dipping control device 40 has lowered the evaporator flask 10 vertically downwards into the heating bath via the actuation of the lift 30. As a result, the filling level N15b inside the evaporator flask 10 has come to lie lower down in absolute terms. The level of the heating bath P25b has been increased by dipping the evaporator flask 10 into the heating bath 20 since the flask has displaced medium of the heating bath 20. The base BK of the evaporator flask 10 has likewise been lowered and now still lies above the base BH of the heating bath 20. However, the distance between the base BK of the evaporator flask 10 and the base BH of the heating bath 20 has been reduced compared with the starting situation in FIG. 1a. In the process, the dipping control device 40 has lowered the evaporator flask 10 via the lift 30 so far that the difference between the level N15b and the level P25b reaches a predefined value, −1 cm in the present case.

If the level of the heating bath P25b now rises too far as the evaporator flask 10 is lowered and it is to be feared that the heating bath will overflow, this can be recognized through detection of the level and prevented through the control.

If, during operation, the level P25b or the level N15b now changes, the dipping depth can be changed via the dipping control device 40, with the result that the difference between the level N15b and the level P25b reaches the desired value again. In the case of continuous evaporation of a component from the mixture in the evaporator flask 10, this can be accomplished by moving the evaporator flask 10 vertically upwards as the filling level P25b falls, with the result that the difference between the level N15b and the level P25b reaches the predefined value again. Should too much medium vaporize from the heating bath 20, it is also possible to top up medium into the heating bath 20 such that the level P25b rises again—it is possible that too high a level P25b then also has to be compensated for here again by raising the evaporator flask 10 via the lift 30, with the result that the predefined value is again reached between the level N15b and the level P25b. Preferably, in addition medium can also be added to the heating bath 20 if the distance between the base BK of the evaporator flask 10 and the base BH of the heating bath 20 falls below a critical value, since the evaporator flask 10 is then likewise raised in order to re-establish the desired difference.

Before a distillation, the lift is typically located in the upper position. When the user has attached the flask 10 (with mixture), they move it downwards into the heating bath 20. It is recommended here that the flask 10 is filled to a maximum of 50% (1000 ml flask→500 ml mixture). The optimum dipping depth is preferably reached when the filling level of the evaporator flask N15b is located approx. 1 cm, preferably approx. 2 cm, particularly preferably more than 3 cm below the heating bath level P25b.

The dipping control device 40 likewise preferably takes into consideration the fact that the flask is not resting on the bottom BH of the heating bath 20. The optimum dipping depth is therefore dependent on the evaporator flask used, the filled volume as well as the level of the medium in the heating bath 20.

Through the invention described here, a rotary evaporator can be provided which makes easy operation possible. Through the rotary evaporator according to the invention, the user only has to attach the flask and press start. Then, the system can subsequently move to the optimum dipping depth autonomously via the dipping control device without further input such as the flask size, filling volume, heating bath state.

Corresponding dipping control devices can be realized via a plurality of modes of action through the sensors used. As soon as the evaporator flask dips into the heating medium, the level of the medium in the heating bath rises here, thus the water level in the present example. This can preferably be monitored by means of a level sensor. The rise in level, with the distance travelled, results in a displaced volume from which the flask size can be calculated.

As soon as the evaporator flask dips into the heating medium, a buoyancy force is also generated. The buoyancy force corresponds to the weight force of the displaced water. By means of force sensors in the feet of the heating bath (balance), an increase in weight can thus be detected. Here too, a conclusion about the size of the flask can be drawn in conjunction with the distance travelled.

It is preferably provided that the evaporator flask passes through a light barrier on the way into the heating bath. With a light barrier, preferably an analogue light barrier, it is possible to draw conclusions about the flask and the volume inside the flask from the shape of the curve, and thus to determine the filling level in the evaporator flask.

The dipping control device can preferably also monitor further states and take them into consideration in the control, such as for example dry running, overflow of the heating bath and control of the addition (or removal) of heating bath medium.

A rotary evaporator has thus been provided which makes possible simplified operation through its control, in particular a control which can react autonomously to changing circumstances as the level of medium from the heating bath changes or to a change in the filling level in the evaporator flask.

LIST OF REFERENCE NUMBERS 1 rotary evaporator
10 evaporator flask
15 filling level of the evaporator flask
20 heating bath
25 level of the heating bath
30 lift
35 moving device for the vertical movement of the evaporator flask
40 dipping control device
45 sensor

What is claimed is:

1. A rotary evaporator comprising:
an evaporator flask, a heating bath, and a moving device integrated in a lift with which the evaporator flask can be moved vertically, wherein the evaporator flask is selectively dipped into the heating bath, the rotary evaporator further comprising a controller for automatically controlling a dipping depth of the evaporator flask into the heating bath, and
wherein the controller controls the dipping depth of the evaporator flask into the heating bath in dependence on the fluid medium level of the heating bath by moving the evaporator flask vertically by the lift, wherein the controller is operable to:
determine a fluid filling level of the evaporator flask;
determine a fluid medium level of the heating bath; and
automatically control, via the lift, the dipping depth of the evaporator flask into the heating bath in dependence of the fluid filling level of the bath, so as to automatically regulate a predefined or optimum dipping depth even if the filling level in the evaporator flask or the level of the medium in the heating bath changes while an evaporation process is occurring.

2. The rotary evaporator according to claim 1, wherein the controller determines a bottom of the heating bath, and wherein the controller controls the dipping depth of the evaporator flask into the heating bath in dependence on the bottom of the heating bath.

3. The rotary evaporator according to claim 1, wherein the controller determines a fluid filling level of the evaporator flask, and
wherein the controller controls the dipping depth of the evaporator flask into the heating bath in dependence on the fluid filling level of the evaporator flask.

4. The rotary evaporator according to claim 1, wherein the controller has one or more sensors from which the fluid filling level of the evaporator flask and/or the fluid medium level of the heating bath can be determined.

5. The rotary evaporator according to claim 4, wherein the one or more sensors function according to one or more of the following principles: optically, mechanically, thermoelectrically, resistively, piezoelectrically, capacitively, inductively, magnetically.

6. The rotary evaporator according to claim 5, wherein the sensors have one or more elements of the following group: light barrier, weight sensor, photosensor, camera, infrared LED, ultrasonic sensor, microwave transmitter and receiver, radar sensor, moisture sensor, filling-level meter, float, level sensor, vibration sensor, electromechanical plumb system, pressure sensor, conductivity sensor, temperature sensor.

7. The rotary evaporator according to one of claim 4, wherein the sensors have one or more elements of the following group: light barrier, weight sensor, photosensor, camera, infrared LED, ultrasonic sensor, microwave transmitter and receiver, radar sensor, moisture sensor, filling-level meter, float, level sensor, vibration sensor, electromechanical plumb system, pressure sensor, conductivity sensor, temperature sensor.

8. The rotary evaporator according to claim 1, further comprising a force sensor positioned below a base of the heating bath to detect an increase in weight of displaced fluid medium in the heating bath corresponding to the dipping depth of the evaporator flask into the heating bath.

9. A method for controlling a rotary evaporator in an ongoing evaporation process, wherein the rotary evaporator comprises an evaporator flask, a heating bath, and a moving device integrated in a lift with which the evaporator flask can be moved vertically, wherein the evaporator flask is selectively dipped into the heating bath, the rotary evaporator further comprising a controller for controlling a dipping depth of the evaporator flask into the heating bath by moving the evaporator flask vertically by the lift, the method comprising the steps of:
determining a fluid filling level of the evaporator flask;
determining a fluid medium level of the heating bath; and
automatically controlling the dipping depth of the evaporator flask into the heating bath in dependence on the fluid filling level of the evaporator flask and in dependence on the fluid medium level of the heating bath so as to automatically regulate a predefined or optimum dipping depth even if the filling level in the evaporator flask or the level of the medium in the heating bath changes while an evaporation process is occurring.

10. The method for controlling a rotary evaporator according to claim 8, wherein the controller has one or more sensors, and the method further comprises the steps of:
determining the fluid filling level of the evaporator flask using a first sensor,
determining the fluid medium level of the heating bath using a second sensor, and
controlling the dipping depth of the evaporator flask into the heating bath in dependence on the filling level of the evaporator flask and in dependence on the fluid medium level of the heating bath.

11. The method according to claim 10 further comprising the steps of:
determining the bottom of the heating bath; and
controlling the dipping depth of the evaporator flask into the heating bath in dependence on the bottom of the heating bath.

12. The method according to claim 9 further comprising the step of: adding additional fluid medium to the heating bath in dependence on the fluid filling level of the evaporator flask and/or in dependence on the fluid medium level of the heating bath.

13. The method according to claim 9, further comprising tilting the evaporator flask relative to a horizontal plane of the heating bath.

14. The method according to claim 9, further comprising sensing, from below the heating bath, an increase in weight of displaced fluid medium in the heating bath which corresponds to the dipping depth of the evaporator flask into the heating bath.

* * * * *